Nov. 9, 1948.   F. E. BRADY, JR   2,453,406
FITTING FOR AUTOMOBILE RADIATORS
Filed Oct. 4, 1947
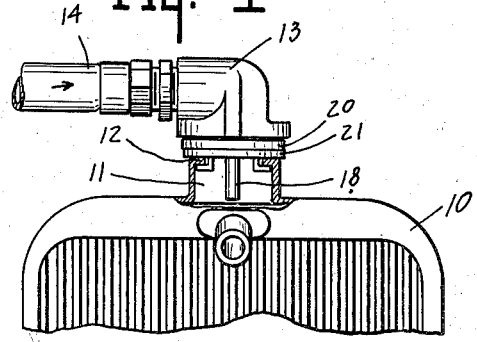
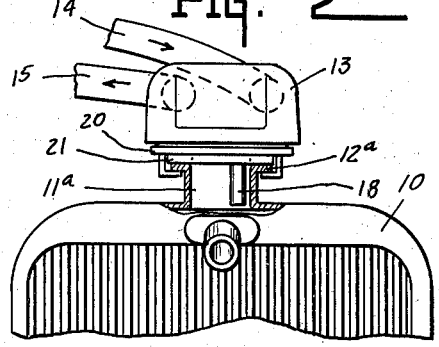
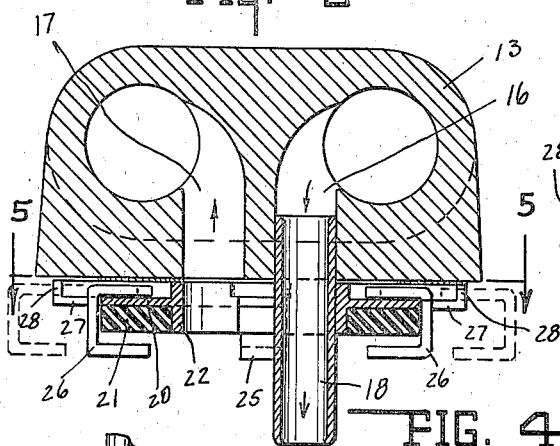
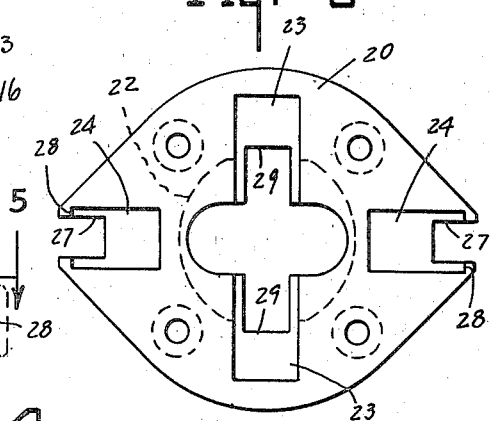
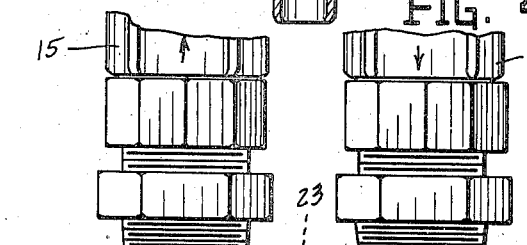
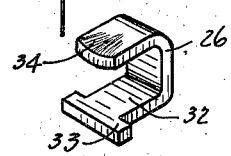
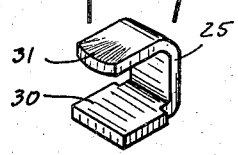
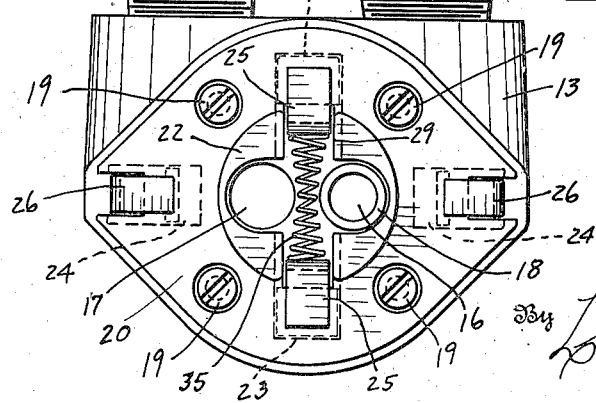
Inventor.
FRANCIS E. BRADY, JR.
By Lockwood, Goldsmith & Galt
Attorneys.

Patented Nov. 9, 1948

2,453,406

UNITED STATES PATENT OFFICE 2,453,406

FITTING FOR AUTOMOBILE RADIATORS

Francis E. Brady, Jr., Muncie, Ind.

Application October 4, 1947, Serial No. 777,904

6 Claims. (Cl. 285—168)

This invention relates to a fitting for automobile radiator filler spouts such as will permit the closure thereof or attachment thereto.

It is the purpose of the invention to provide such a fitting which may be applied to varying sizes, within limits of present day automobile radiator filler spouts, and irrespective of such spouts being provided with internal or external camming and locking flanges.

However, the invention is particularly adapted for use in making a temporary sealed connection with a radiator filler spout for flushing the radiator, and wherein the fitting is permanently connected with inlet and outlet hose or conduits, reference being had to the radiator cleaning system and apparatus as more particularly disclosed in my application for Letters Patent, Serial No. 691,078, filed August 16, 1946.

In such apparatus there is permanently connected with the inlet and outlet hose or conduits a fitting for ready and convenient attachment to various sizes and types of radiator filler spouts, and wherein the fitting is formed with inlet and outlet conduits extending into or communicating with the interior of the radiator through the filler spout. Present day radiator filler spouts vary slightly as to diameter, some being provided with internal camming and locking flanges and some with external camming and locking flanges. The fitting herein provided is arranged to be mounted on and interlock in sealing engagement with various types of filler spouts through the medium of adjustable external and internal gripping fingers.

Thus, with a filler spout having an external flange the external fingers of the fitting may be adjusted to embrace and lock under the flange. Wherein the filler spout may be provided with an internal flange, the internal gripping fingers may be adjusted to extend thereunder. Thereupon, through a partial rotation of the fitting the flange engaging fingers will cam the fitting into sealing engagement with the spout.

The full nature of the invention will be understood from the accompanying drawings and the following description and claims.

Fig. 1 is a side elevation of the fitting showing it mounted on a filler spout having an internal flange shown in cross section.

Fig. 2 is a front elevation of the fitting showing it applied to an externally flanged filler spout shown in section.

Fig. 3 is a central vertical section through the fitting showing the external fingers in extreme inward position of adjustment in full lines and extreme outward position of adjustment in dotted lines.

Fig. 4 is a bottom plan view of the fitting.

Fig. 5 is a top plan view of the finger plate removed from the fitting and with the fingers removed therefrom viewed on the line 5—5 of Fig. 3.

Fig. 6 is a perspective view of one of the external gripping fingers.

Fig. 7 is a perspective view of one of the internal gripping fingers.

In the drawings there is schematically illustrated an automobile radiator 10 having the usual filler spout 11 or 11a through which the radiator and cooling system of the automobile may be filled with the cooling liquid, usually water.

The filler spout 11 of Fig. 1 is illustrative of that type having opposed internal camming and locking flanges 12. The filled spout 11a as shown in Fig. 2 is of that type having opposed external camming and locking flanges 12a. The camming and locking flanges of said filler spouts are adapted to receive and cam into sealing engagement the usual filler cap upon the cap being partially rotated.

However, the fitting which is the subject of this invention is adapted to be temporarily connected in sealing engagement with either type of filler spout and of varying sizes to permit cleansing and flushing of the radiator and cooling system. For that purpose there is provided a fitting comprising a head 13 to which there is connected an inlet hose 14 and an outlet hose 15 communicating with the passageways 16 and 17, respectively, formed within the head. The inlet passageway 16 is provided with an injector nozzle 18 adapted to extend downwardly through the filler spout and the passageway 17 is also in communication therewith. Thus, the cleansing solution or flushing water may be discharged through the hose 14, passageway 16, and nozzle 18 into the radiator and exhausted therefrom through the passageway 17 and hose 15.

Secured to the connecting face of the body 13 by the screws 19 there is a finger plate 20 over which the rubber gasket 21 is adapted to lie for seating over the upper edge of the filler spout in sealing engagement therewith. The finger plate 20 is formed with a downwardly extending boss 22 about which the rubber gasket 21 is mounted, and on the opposite surface thereof lying adjacent the face of the head 13 it is formed with a series of recessed pockets 23 and 24 (Fig. 5).

There are a pair of pockets 23 extending radially outwardly in opposed relation from the central opening of the plate for slidably receiving the internal gripping fingers 25 as shown in Fig. 7. The pockets 24 are diametrically opposed from each other and offset 90 degrees from the pockets 23, opening externally of the plate to slidably receive the externally gripping fingers 26 as shown in Fig. 6. Each of the pockets 24 is slotted inwardly at 27 leaving a shoulder 28, whereas the pockets 23 are slotted internally at 29.

The internal gripping finger 25 is U-shaped in form and is provided with an enlarged sliding base portion 30 adapted to slide radially of the finger plate within the pocket 23. The base portion 30 is connected by a neck portion with a slightly dished lip portion 31 formed to extend downwardly and radially outwardly in spaced relation to the gasket 21 for engaging the underside of the camming and locking flange 12 of the filler spout 11. The external gripping fingers are similarly formed with a reduced base portion 32 adapted to seat and slide within the pocket 24 of the finger plate, and having an enlarged head 33 adapted to abut the shoulder 28 of said plate to limit the outward movement of the finger to its extreme position as shown by dotted lines in Fig. 3. Said finger 26 is formed with an intermediate neck portion terminating in the dished lip portion 34 adapted to extend radially inwardly about the gasket 21 and spaced therefrom for engagement with the external camming and locking flange 12a of the filler spout 11a as shown in Fig. 2.

Between the internal gripping fingers 25 there is mounted a very light double conical spring 35 which is sufficiently light to permit said fingers to be manually adjusted toward or from each other according to the inner diameter of the filler spout 11, but under sufficient tension to prevent them from dropping down out of adjusted position when the fitting is overturned to be mounted over the spout. The head 33 of the finger 26 prevents the finger from sliding radially outwardly beyond the limiting shoulder 28.

In operation, when the fitting is to be applied to an internally flanged filler spout 11, the internal gripping fingers 25 are manually adjusted and offset by sliding them within their respective pockets 23 so that they may be inserted within the spout between the flanges 12. The pressure exerted on the fingers by the spring 35 has the effect of slightly tilting and frictionally locking them for holding in their adjusted position. The fitting is then placed over the spout with the internal fingers so related to the camming and locking flanges 12 as to engage therewith and draw the fitting into sealing engagement upon a partial rotation thereof in the same manner as the usual filler cap. When the fitting is to be applied to a filler spout having the external flanges 12a, the external fingers 26 are similarly adjusted within their pockets 24 to clear the neck of the spout and extend under the flanges 12a to be cammed thereby into locking and sealing position upon a partial rotation of the fitting.

While the invention has been particularly described in respect to a fitting for cleaning and flushing radiators, it may be employed in a similar manner for other purposes or as a closure cap for universal application to the present day type of automobile radiator filler spouts.

The invention claimed is:

1. A fitting for an automobile radiator having a filler spout provided with camming and locking flanges thereon comprising a fitting head, a finger plate secured to said head with its inner adjacent surface formed with radially extended and opposed pockets, and a plurality of gripping fingers slidably mounted in said pockets, respectively, for manual adjustment toward and from each other in position to engage and interlock with said flanges of varying diameter.

2. A fitting for an automobile radiator having a filler spout provided with camming and locking flanges thereon comprising a fitting head, a finger plate adapted to be secured to said head having its inner adjacent surface formed with a pair of radially opposed internal pockets and a pair of radially opposed external pockets, and a plurality of internal and external gripping fingers radially slidable within each of said pockets, respectively, said fingers having an overhanging lips adapted for manual adjustment toward and away from each other to a position for engaging and interlocking with radiator flanges of varying diameter.

3. A fitting for an automobile radiator having a filler spout provided with internal camming and locking flanges thereon or a filler spout provided with external camming and locking flanges comprising a fitting head, a finger plate adapted to be secured to said head having its inner adjacent surface formed with a pair of radially opposed internal pockets and a pair of radially opposed external pockets, internal gripping fingers slidably mounted in each of said internal pockets, each having an overhanging lip extending outwardly away from each other adapted for manual adjustment to engage and interlock with said internal flanges of varying diameter, and a pair of external gripping fingers slidably mounted in said external pockets, respectively, each having inwardly extending overhanging lips adapted for manual adjustment to engage and interlock with the said external flanges of varying diameter.

4. A fitting for an automobile radiator having a filler spout provided with internal camming and locking flanges thereon or a filler spout provided with external camming and locking flanges comprising a fitting head, a finger plate adapted to be secured to said head having its inner adjacent surface formed with a pair of radially opposed internal pockets and a pair of radially opposed external pockets, internal gripping fingers slidably mounted in each of said internal pockets, each having an overhanging lip extending outwardly away from each other adapted for manual adjustment to engage and interlock with said internal flanges of varying diameter, a pair of external gripping fingers slidably mounted in said external pockets, respectively, each having inwardly extending overhanging lips adapted for manual adjustment to engage and interlock with the said external flanges of varying diameter, and a compression spring interposed between said internal gripping fingers effective to frictionally maintain them in adjusted position.

5. A fitting for an automobile radiator having a filler spout provided with internal camming and locking flanges thereon or a filler spout provided with external camming and locking flanges comprising a fitting head, a finger plate adapted to be secured to said head having its inner adjacent surface formed with a pair of radially opposed internal pockets and a pair of radially opposed external pockets, internal gripping fingers slidably mounted in each of said internal pockets, each having an overhanging lip extending outwardly away from each other adapted for manual adjustment to engage and interlock with said internal flanges of varying diameter, a pair of external gripping fingers slidably mounted in said external pockets, respectively, each having inwardly extending overhanging lips adapted for manual adjustment to engage and interlock with the said external flanges of varying diameter, and inner engaging shoulders formed on said external fingers and said plate, respectively, for limiting their extreme outward position and retaining them in said pockets.

6. A fitting for an automobile radiator having a filler spout provided with internally extending camming and locking fingers or a radiator having a filler spout provided with external camming and locking flanges thereon, comprising a fitting head having inlet and outlet passageways therethrough for connection with inlet and outlet conduits, respectively, a finger plate adapted to be secured to said head about said passageways having its inner adjacent face formed with radially opposed elongated pockets and a slot opening internally thereof, an internal gripping finger having a base portion slidably confined in each of said pockets and an outwardly extending lip portion extending in spaced relation over the opposite surface of said plate, each of said fingers being slidably adjustable within said pocket and recess toward and away from each other to a position for engagement and interlocking with internal flanges of varying diameter, a spring interposed between said fingers for causing them to be frictionally held to adjusted position, said plate being formed with a pair of radially opposed external pockets having an external slot formed therein embraced by limiting shoulders, and a pair of external gripping fingers each having a base portion slidably mounted in one of said external pockets limited by said shoulder portion therein and a downwardly and inwardly extending lip portion adjustable in said pocket and slot and spaced from the opposite surface of said plate whereby said external fingers may be adjusted toward and away from each other to a position for engaging and interlocking with external flanges of varying diameter.

FRANCIS E. BRADY, Jr.

No references cited.